Dec. 6, 1960   J. BORRINO   2,962,890
WEAR TESTER
Filed Nov. 25, 1957
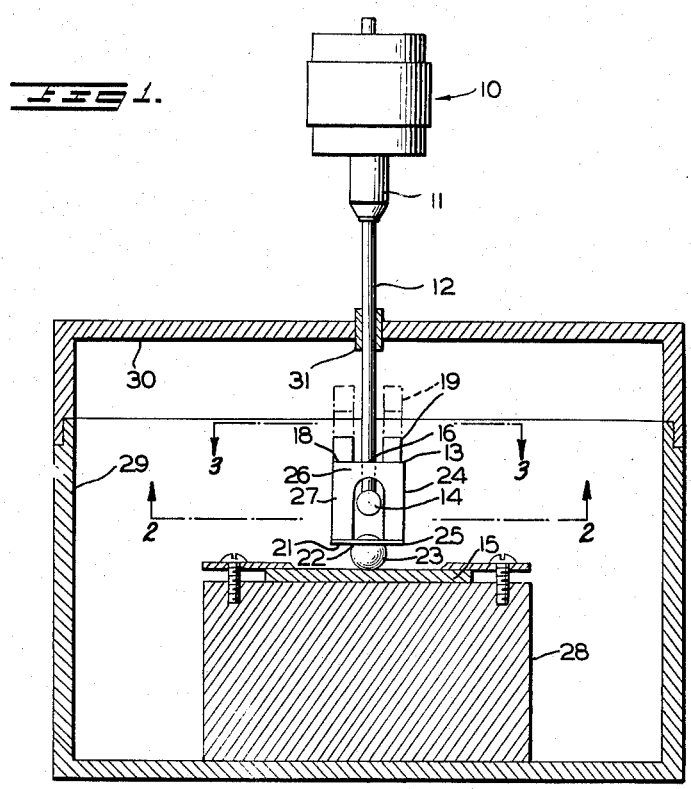
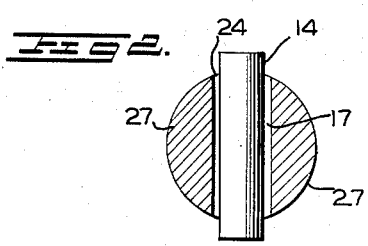
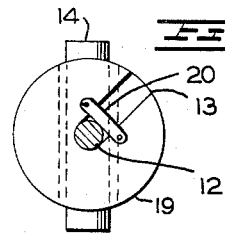
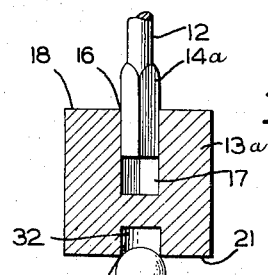
INVENTOR
JOSEPH BORRINO
BY Adams, Forward and McLean
ATTORNEY

United States Patent Office 2,962,890
Patented Dec. 6, 1960

2,962,890
WEAR TESTER

Joseph Borrino, Park Forest, Ill., assignor to Sinclair Research Laboratories, Inc., Harvey, Ill., a corporation of Delaware Filed Nov. 25, 1957, Ser. No. 698,480

3 Claims. (Cl. 73—7)

This invention concerns a device for testing the wearing qualities of materials, especially ferrous metals.

In the past, devices have been used to test the wear characteristics of materials which work on the principle of a revolving specimen contacting a stationary wearing member or a revolving wear member contacting a stationary specimen with a consequent erosion of the specimen. Comparison of the weight lost by different materials under the same conditions gives a measure of the relative wearing qualities of these materials. These devices, however, are subject to the disadvantage that as soon as a slight amount of the specimen and/or the wear member is eroded, the contact pressure between the specimen and the wearing member is changed, giving test results which are inaccurate and misleading. These devices also normally require extensive alterations to change the contact pressure between the specimen and the wearing member and usually are not adaptable to testing the wearing qualities of the specimen under a variety of surrounding conditions.

In contradistinction to these, the present invention provides a device for testing the wear characteristics of the specimen of material wherein the contact pressure between the specimen and the wear member can be kept constant and wherein the tests may be conducted under a variety of atmospheres or liquid media. An important feature of the present invention is the provision of a wearing member which tends to sink into the void produced by erosion of the specimen without a change in the pressure therebetween. Also, since the wearing member is itself eroded, this invention provides for distributing this deterioration over a greater surface of the wearing member than is in actual contact with the specimen at any one time.

The drawing of Figure 1 represents a side view, with the side of the container cut away, of a preferred embodiment of the invention;

Figure 2 is a cross-sectional view along the line 2—2' of Figure 1;

Figure 3 is a cross-sectional view along the line 3—3' of Figure 1; and

Figure 4 is a representation of an alternate form of the coupling member.

The drawings are to be considered as illustrative and not limiting.

Power is supplied by any suitable source of torque, such as the variable speed electric motor 10. The rotor of the motor is connected to a chuck 11 of conventional design, such as a friction chuck. Inserted in the chuck 11 is the drive shaft 12. In the preferred embodiment, this drive shaft has a circular cross section.

The drive shaft is keyed to transmit torque to the coupling, indicated generally as 13. It is particularly advantageous to provide the end of the drive shaft with the horizontal cross-member 14 as the key. This expedient enables the coupling to be supported on the drive shaft when the rotating member is lifted away from the specimen 15 at the end of the test.

The coupling contains a top aperture 16 which leads to the vertical passage 17. This vertical passage is splined to provide a seat for the key which is attached to the drive shaft. The spline extends a greater vertical distance than the key.

The top 18 of the coupling 13 is flat, providing a support for weights 19. These weights are disposed annularly about the shaft 12, resting on one another. They are not attached to each other but may be held loosely around the shaft by any suitable means, such as the recessed, openable strap 20. This arrangement allows the contact pressure on the specimen to be freely varied by adding or removing weights.

The bottom surface 21 of the coupling structure 13 is provided with a circular aperture 22, which provides a seat for the ball 23. This aperture is aligned with the top aperture 16 and is smaller in diameter than the ball 23. The contact between the wearing ball 23 and the coupling 13 is preferably limited to almost a mere circular line. This factor is important in tests conducted in an abrasive medium since it minimizes wear on the ball caused by contact with the seat or aperture 22, while still providing enough friction to transmit torque from the coupling to the ball.

The preferred coupling structure comprises a bifurcated member 24 which straddles the cross-member 14 attached to the shaft. This member may have more than two legs 27. A flat washer 25 is fixed across the legs 27 of the bifurcated member 24 to provide a circular seat for the ball 23. This composite structure simplifies assembly of the device and provides an easily replaced seat for the ball when the seat is eroded beyond the desired stage.

In addition, the bifurcated member 24 may comprise magnetized material. This has the additional advantage that, when the ball 23 is made of a substance susceptible to magnetism, the ball will cling to the coupling when the rotating member is lifted from the specimen at the end of the test. An additional advantage in the use of the magnetic coupling is the fact that the magnetic flux will help transmit torque to the ball 23 in addition to that transmitted due to friction developed by the weight of the coupling assembly. Also, in such circumstances, the washer 25 may be magnetically susceptible and be held to the rest of the coupling by magnetism. The magnetic power of the member 24 should not be so strong that it will overcome the centrifugal force built up by the rotation of the shaft and cling so strongly to the shaft as to prevent vertical movement during the test. The magnet preferably comprises a cross-member 26 provided with a passage for the drive shaft and having a plurality of integral legs 27.

The ball 23 is held against a specimen 15 of the material to be tested and sinks into the specimen as the specimen is eroded. The specimen is mounted on a suitable support 28 which is placed on the floor of the container 29. This container is of such size that the entire apparatus, from the coupling assemblage down, may fit inside it. The container preferably is provided with a cover 30 to enclose the system as in Figure 1, leaving a passage for the drive shaft, and fitted with a suitable bearing seal 31. The cover is to be used when the test is made to determine the wear resistance of the specimen in an abrasive atmosphere such as dust-laden air.

In alternative embodiments, as shown for example in Figure 4, the keying may be accomplished by providing a non-circular cross-sectional shape for the entire drive shaft or at least the lower end of the shaft which projects into the coupling, as shown by member 14a.

The coupling may be a machined block of material as shown at 13a instead of the composite structure shown in Figure 1. The block may be magnetized or not. When such a unitary structure is used, the part of the block immediately above the aperture 22 is preferably machined out leaving a space as at 32. This will insure minimum contact between the ball and the seat and allow for substantial rolling movement of the ball, as well as rotation. The space 32 may be deep enough to merge with the vertical passage 17. The greater vertical extension of the spline over the key may exist at all times, as in Figure 1, or may only exist when the erosion of the specimen 15 has allowed the coupling 13a to slip down on the shaft 12, shown in Figure 4.

The cover need not be used when the apparatus is to be submerged in a liquid, such as a dispersion of silicon-carbide grit in water or oil. The container may be provided with heating or cooling coils or be made to withstand external or internal gas pressures when temperature and pressure considerations are important in making the test.

The wear tester of the invention was developed for wear tests involving small sections of heat-treated steels and is adaptable to the wear testing of non-metals, non-ferrous metals, and combinations of ferrous and non-ferrous metals. The apparatus can be used for evaluating wear due to abrasion and/or attrition in media comprising air, inert gases, reactive gases, abrasive-containing solutions, corrosive solutions or lubricating solutions. It has been found that in metal-to-metal abrasion tests using a steel ball hardened to 65 Rc, the ball wears at least as much as the specimen. The necessary replacement of the ball after each test can be accomplished easily using the device of the invention.

From all the wear tests performed, it appears that the speed of testing and relative hardness of the ball, as well as the composition of the surrounding fluid, are important variables in determining the wear characteristics of the specimen. The device of the invention provides a simple apparatus wherein all these variables can be changed quickly from test to test while maintaining uniform conditions during the test.

I claim:
1. A wear test apparatus comprising a vertical drive shaft; a wearing ball; and a coupling; said drive shaft being inserted vertically in said coupling and having a key attached thereto for transmitting torque to said coupling, while permitting free reciprocation of said coupling on said shaft; said coupling providing a support for a plurality of removable weights and having top and bottom apertures, said top aperture receiving said drive shaft and leading to a vertical passage which is vertically splined a greater distance than the vertical dimension of said key, said bottom aperture being circular and having a diameter less than the diameter of said ball, said coupling resting on said ball due to the force of gravity on said coupling and weights; said ball being free to contact a specimen and being capable of sinking into the void made by the erosion of said specimen by said ball upon rotation of said shaft.

2. The apparatus of claim 1 in which the coupling comprises a permanent magnet and a washer magnetically held to said magnet for receiving said ball.

3. The apparatus of claim 1 in which the key is a cross-member at the bottom of said shaft capable of supporting said coupling.

References Cited in the file of this patent
UNITED STATES PATENTS

| | | |
|---|---|---|
| 2,370,606 | Morgan et al. | Feb. 27, 1945 |
| 2,436,435 | Kent | Feb. 24, 1948 |
| 2,603,083 | Schiefer | July 15, 1952 |

OTHER REFERENCES

Strasser: "13 Ways To Couple Shafts," Product Engineering Design Edition, Aug. 4, 1958, pp. 60–61.